United States Patent
Bertram

[11] Patent Number: 5,673,574
[45] Date of Patent: Oct. 7, 1997

[54] VEHICLE WHEEL IMMOBILIZING CLAMP

[76] Inventor: Bruce H. Bertram, Box 172, Birtle Manitoba, Canada, R0M 0C0

[21] Appl. No.: 602,308

[22] Filed: Feb. 16, 1996

[51] Int. Cl.$^6$ .................................................. B62H 5/16
[52] U.S. Cl. ................................................ 70/18; 70/226
[58] Field of Search .................................. 70/14, 18, 19, 70/225, 226, 237, 259, 260; 188/32

[56] References Cited

U.S. PATENT DOCUMENTS

| | | | |
|---|---|---|---|
| 561,070 | 5/1896 | Anderson | 70/226 |
| 1,136,735 | 4/1915 | Taylor | 70/18 |
| 1,293,109 | 2/1919 | Kaplan | 70/19 |
| 1,347,262 | 7/1920 | Eichorn | 70/18 |
| 1,443,009 | 1/1923 | Davis . | |
| 1,448,658 | 3/1923 | Furber . | |
| 1,488,893 | 4/1924 | Plouffe . | |
| 1,524,086 | 1/1925 | Doble et al. | 70/18 |
| 1,530,622 | 3/1925 | Roberts | 70/18 |
| 1,548,584 | 8/1925 | Dietrich | 70/19 |
| 3,667,259 | 6/1972 | Reque et al. | 70/203 X |
| 3,907,072 | 9/1975 | Shafer | 188/32 |
| 4,085,599 | 4/1978 | Fischer et al. | 70/14 |
| 4,164,131 | 8/1979 | Desmond et al. | 70/14 |
| 4,723,426 | 2/1988 | Beaudoin | 70/14 |
| 4,732,018 | 3/1988 | Crosby | 70/237 X |
| 4,768,359 | 9/1988 | Wade | 70/14 |
| 5,134,868 | 8/1992 | Bethards | 70/18 |
| 5,247,815 | 9/1993 | Caldwell | 70/19 |

FOREIGN PATENT DOCUMENTS

| | | | |
|---|---|---|---|
| 48534 | 3/1934 | Denmark . | |
| 2330833 | 6/1977 | France | 70/18 |
| 335862 | 4/1921 | Germany | 70/18 |
| 373263 | 4/1923 | Germany . | |
| 175600 | 3/1935 | Switzerland | 70/14 |

*Primary Examiner*—Lloyd A. Gall
*Attorney, Agent, or Firm*—Adrian D. Battison; Murray E. Thrift

[57] ABSTRACT

An immobilizing clamp for engaging the wheel of a vehicle comprises a pair of flat plates coupled together by a pivot pin so that the surfaces of the plates slide one on the other. The plates define a base portion which is generally rectangular and a single arm extending from the base portion. The base portion has a pivot pin and a lock with the lock and pivot pin lying generally on a line symmetrical of the two clamping members and passing through end points at the ends of the arms. The height and width of the base portion is so that there is significant overlap which provides sufficient strength to prevent leverage against the clamping members from forcing the end points of the arms apart either in the common plane or at right angles to the common plane.

1 Claim, 2 Drawing Sheets

VEHICLE WHEEL IMMOBILIZING CLAMP

BACKGROUND OF THE INVENTION

The present invention relates to a clamp for attachment to a single wheel of a vehicle to immobilize the wheel and therefore to immobilize the vehicle.

A number of devices have previously been proposed for clamping a wheel of a vehicle to immobilize the vehicle. Some such clamping devices are used by public authorities to immobilize illegally parked vehicles. And these tend to be relatively large and complex and therefore relatively expensive. Other clamping devices of this type are generally intended for simple immobilization of the vehicle to prevent theft. This is a particular problem in regard to trailers which are left unattended often in remote locations since it is difficult to prevent a thief with a towing vehicle from simply hitching to the trailer and removing it.

Much theft of trailers in this manner is opportunistic and there is a high demand therefore for a simple clamping device which can be engaged onto the wheel of a trailer so that the vehicle cannot be readily towed away. Such a device is desirably inexpensive, simple to apply and simple to transport without complex parts and a complex shape which will make storage and transportation of the device difficult. While such a device may not prevent removal of the device and theft of the vehicle by a determined and well tooled thief, it can readily prevent simple opportunistic theft.

Some examples of clamping devices of this type have been identified in the following patents, U.S. Pat. No. 1,488,893 (Plouffe); U.S. Pat. No. 1,448,658 (Furber); U.S. Pat. No. 4,723,426 (Beaudoin); U.S. Pat. No. 4,768,359 (Wade); U.S. Pat. No. 1,443,009 (Davis); U.S. Pat. No. 5,247,815 (Caldwell); U.S. Pat. No. 3,907,072 (Shafer; U.S. Pat. No. 5,134,868 (Bethards); German 373263; Denmark 48534 (Werke).

Plouffe discloses a clamping device which is relatively complicated in that it includes two elements across the front of the vehicle each of which engage a respective one of the wheels. The device is clamped by a rod which extends across the full width of the vehicle. Transportation of the device is therefore difficult and the device includes a number of moving parts. Furthermore the two clamping members are spaced apart by the bar therebetween so there is a possibility to leave them and bend them further apart to allow removal. Davis discloses a similar arrangement.

Many of the remaining patents include a number of moving parts with relatively thin simple arms which engage around the wheel and are held together by connecting rods. These devices are relatively weak and any leverage applied to the arms will in many cases allow the arms to be bent sufficiently for removal of the device from the wheel.

SUMMARY OF THE INVENTION

It is one object of the present invention, therefore, to provide an improved clamping device which engages on a single wheel which is of a simple yet rugged construction allowing it to be readily transported, readily applied and yet has significant strength to prevent the device from being levered sufficiently to bend the device for removal.

According to one aspect of the invention there is provided a clamp for attachment to a single wheel of a vehicle to immobilize the wheel and therefore to immobilize the vehicle, the clamp comprising: a first clamping member and a second clamping member; each clamping member comprising a body cut from a flat plate to define a first flat face and a second flat face; each clamping member being shaped to define a base portion and an arm connected at one end of the arm to one side of the base portion and extending therefrom; a pivot pin interconnecting the clamping members so that the first face of the first clamping member is substantially immediately adjacent the second face of the second clamping member, the pivot pin being arranged to allow pivotal movement of each of the clamping members relative to the other about an axis of the pin; the pivot pin passing through the base portion of each clamping member; each arm extending from the base portion of the respective clamping member at a position to one side of the pivot pin and arranged to extend around a hole between the arms so that the arms wrap around a tire and rim of the wheel with the base portion of each clamping member outwardly of the tire and ends of the arms closely adjacent inside the rim of the wheel; and a lock for locking for the clamping members in position when wrapped, the lock comprising a pin engageable through aligned holes of the clamping members, the holes being arranged in the base portion of each clamping member.

Preferably the locking pin and the pivot pin are arranged so as to lie substantially on a common line passing therethrough and extending to the ends of the arms and preferably the locking pin is arranged on the opposite side of the pivot pin relative to the ends of the arms.

Preferably the base portion is wider in a direction from the hole outwardly to an edge thereof opposite to the ends of the arms than the width of the arms from the hole outwardly to an outer edge of the arms at a position on the arms opposite to the base portion and preferably the base portion is substantially double the width of the arms.

Preferably at least one of the clamping members has a plurality of holes in the base portion thereof arranged arcuately around the pivot pin such that selected ones of the holes align with a hole in the other of the clamping members to provide adjustment of the position of the ends of the arms in the locked position.

Preferably the first face of the first clamping member is immediately in contact with the second face of the second clamping member.

Preferably each clamping member includes a single arm extending from the base portion only to one side thereof.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
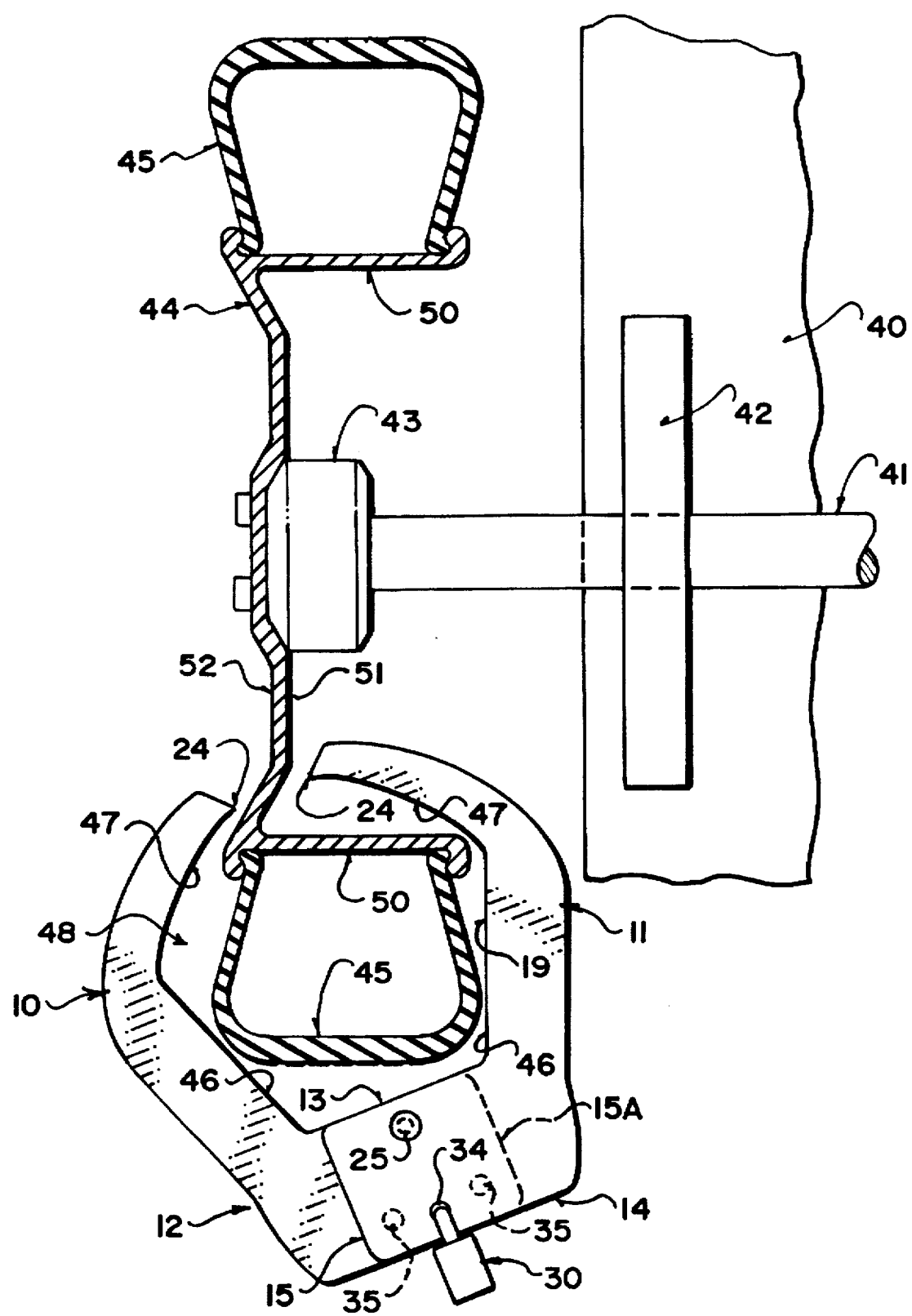
FIG. 1 is a cross sectional view through a wheel of a vehicle showing an immobilizing clamp according to the present invention attached to the wheel.

The immobilizing clamp as shown in the drawings comprises a first clamping member 10 and a second clamping member 11, each of which is formed by cutting from a flat plate so as to form a flat body. The bodies are substantially identical and each comprises a base portion 12 which is generally rectangular with a top edge 13, a bottom edge 14, a side edge 15 and a second side edge 16. Each clamping member further includes an arm 17 which has an outside edge 18 contiguous with the edge 16 of the rectangular base portion and an inside edge 19 commencing partway along the top edge 13 of the base portion. The arm thus is connected to one side of the base portion and extends therefrom upwardly from the top edge 13 and slightly outwardly from the side edge 16. The arm includes a bend section 20 and then turns inwardly toward a symmetrical center line 21 of the clamp to form an end portion 22 of the arm which approaches the center line 21. An end edge 23 of the end portion 22 of the arm is cut obliquely to the center line 21 so as to form facing points 24 of the arms.

The clamping members 10 and 11 are connected together so that a first surface 10A of the clamping member 10 is immediately adjacent a second surface 11B of the clamping member 11. The clamping members are held in their positions overlying one another by a pivot pin 25 which passes through a hole 26 in each of the clamping members in a position through the base portion thereof and lying substantially on the symmetrical center line 21. The pivot pin 25 and the holes 26 are arranged adjacent to but spaced outwardly from the top edge 13 of the base portions. The pivot pin and the holes are arranged so that the base portions overlap by an overlapping extent between the edge 15 of the clamping member 11 and the edge 15A of the clamping member 10. The edges are arranged adjacent to a point of interconnection between the top edge 13 and the inside surface 19 of the arm as indicated at 27. The clamping members 10 and 11 are therefore able to pivot about the pivot pin 25 so as to increase the spacing between the points 24 of the arms. The pivot pin 25 is shaped with upper and lower flanges so as to maintain its position fixed in the holes 26 while holding the clamping members closely together by contact of the flanges with the second surface 10B of the clamping member 10 and the first surface 11A of the clamping member 11.

By the term immediately adjacent used previously to describe the positioning of the clamping member 10 relative to the clamping member 11, as shown in the embodiment, this includes an arrangement in which the surfaces 10A and 11B are immediately in contact and therefore slide one relative to the other. It is also possible that an intervening washer or simple bearing surface may be provided which is relatively thin and assists only in the relative sliding movement. However this term is not intended to include an arrangement in which there is an intervening member or structural element between the clamping members. Such an intervening structural element would provide the difficulty that a lever applied between the clamping members could lever them apart by providing a twisting action at the pin 25. In the arrangement, the clamping members remain substantially in contact both at the base portion and at the arms if overlapped so it is difficult to provide twist to the structure which would increase the space between the points 24.

It will also be noted that the height of the base portion between the top edge 13 and the bottom edge 14 is substantially greater than the width of the arms between the inside surface and the outside surface particularly in the area of the end edges 23 and is preferably of the order of double the width in order to provide additional structural strength to the clamp in the area of the base portion.

As shown in FIG. 1, the clamping members 10 and 11 can be locked in place by insertion of a padlock 30 through a selected one of a plurality of overlying holes 35. The holes lie on an arc surrounding the pin 25 so that a single hole in the base portion of the clamping member 10 can align with a selected one of the holes 35 in the base portion of the clamping member 11. The selection of one of the holes thus varies the distance between the points 24 of the arms of the clamping members.

Figure 2:
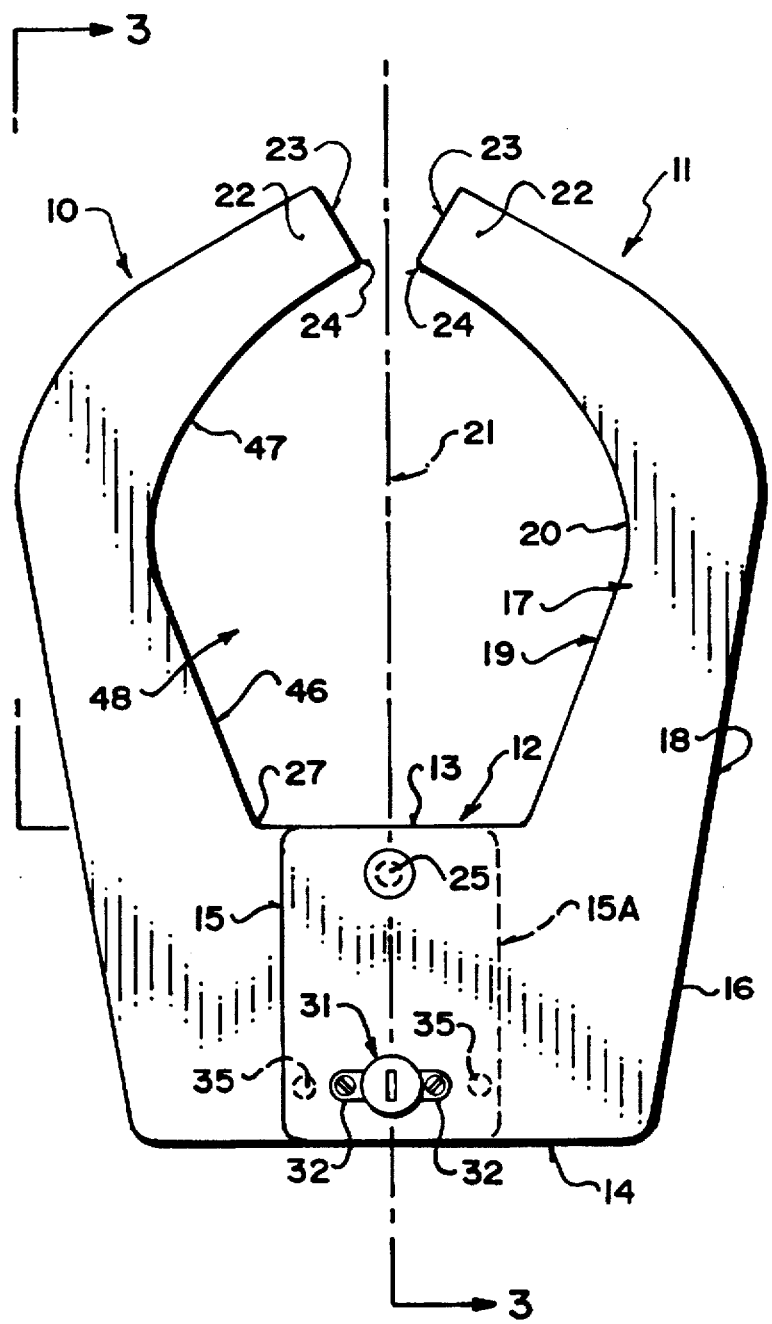
FIG. 2 is a top plan view of an immobilizing clamp according to the present invention which is similar to but slightly modified from the arrangement of FIG. 1.
Figure 3:
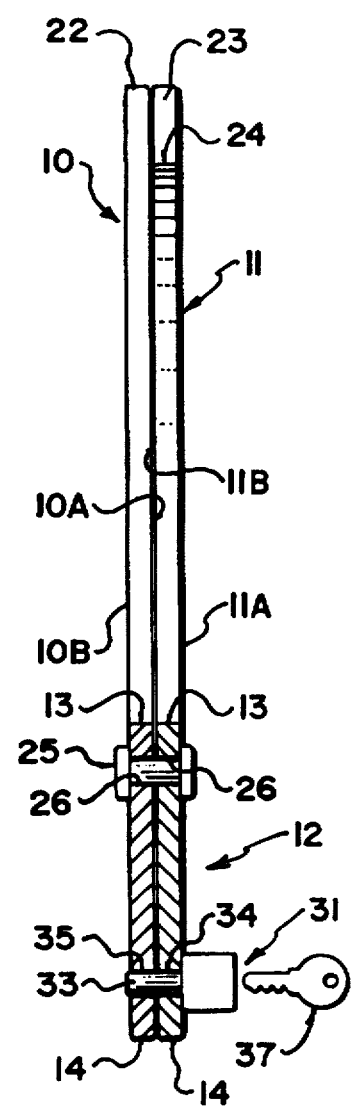
FIG. 3 is a cross sectional view along the lines 3—3 of FIG. 2.

In the arrangement shown in FIG. 2, there is shown a locking device 31 of the type which is clamped to the surface 11A of the clamping member 11 by screws 32. The lock 31 carries a pin 33 and is operable by a key 37 to extend and retract the pin 33 so that the pin projects through a hole 34 in the base portion of the clamping member 11 and through a selected one of a plurality of holes 35 in the base portion of the clamping member 10.

Thus the lock 31 can be operated to retract the pin 33, to pivot the clamping members to increase the spacing between the points 24, to wrap the clamping members around a tire and wheel as shown in FIG. 1 and then to close the clamping members to a position in which the points 24 are in contact with or slightly spaced outwardly from the rim of the wheel as shown in FIG. 1 whereupon the lock 31 is actuated to engage the pin into a selective one of the holes 35.

It will be noted that the lock 31 and the associated holes are positioned outwardly of the pin 25 in the base portion. Thus the pivot pin 25 and the lock lie substantially on the center line 21. In this way the lock and the pivot pin are spaced by substantially the full height of the base portion of each of the clamping members. The spacing of the lock and the pivot pin provide significant strength to the structure to prevent the clamping members being opened by a leverage action on one of the arms relative to the other arm.

Thus the amount of overlap between the top edge 13 and the bottom edge 14 and between the side edges 15 and 15A provides a significant strength to the structure and reduces the forces on the lock and the pivot pin. This prevents leverage from opening the structure while the clamping members remain in a common plane or prevents opening the structure by twisting the points 24 in opposite directions out of the common plane.

In FIG. 1 is shown a vehicle generally indicated at 40 with an axle 41 and a suspension 42. On the axle is mounted a wheel hub 43 to which is attached the wheel rim 44 carrying a tire 45.

The arms are shaped so that the inside surface 19 includes a first straight portion 46 diverging outwardly relative to the top edge 13 and then a smoothly curved section 47 which curves back toward the point 24. This shape defines a hollow opening 48 which is sufficient to receive the tire 45 and the outside support element 50 of the rim so that the points 24 are engaged in contact with or closely adjacent the inside surface 51 and the outside surface 52 of the wheel behind the support 50 and the tire 45.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combination of a single wheel of a vehicle and a clamp attached to the wheel to immobilize the wheel and therefore to immobilize the vehicle;

the wheel comprising a wheel rim and a wheel tire engaged on the rim;

the clamp comprising:

a first clamping member and a second clamping member;

each clamping member comprising a body cut from a flat metal plate to define a first flat face and a second flat face;

each clamping member being shaped to define a base portion and an arm connected at one end of the arm to an inner edge of the base portion and extending therefrom, the base portion having an outer edge spaced from the inner edge;

a pivot pin passing through a single hole in each clamping member so as to interconnect the clamping members with the first face of the first clamping member immediately in contact with the second face of the second clamping member, the pivot pin being arranged to allow pivotal movement of each of the clamping members relative to the other about an axis of the pin;

the single hole in each of the clamping members being shaped to allow said pivotal movement while preventing any sliding movement of one clamping member relative to the other in a direction transverse to the pin;

the base portion and arm of each clamping member being shaped such that the base portions partly overlap and with the inner edges thereof lying on a common line and the outer edges thereof lying on a second common line;

the pivot pin passing through the base portion of each clamping member at a position thereon closer to the inner edge of the base portion than to the outer edge;

the pivot pin having a first head directly engaging the second face of the first clamping member and a second head directly engaging the first face of the second clamping member;

each arm extending from the inner edge of the base portion of the respective clamping member and arranged to define an opening having a base of the opening at the inner edges and sides at the arms so that the arms wrap around the tire and rim of the wheel as a loose fit with parts of the arms and inner edge spaced outwardly from the tire and rim leaving a space between each clamping member and the tire with the base portion of each clamping member outwardly of the tire and ends of the arms spaced apart by a distance to prevent the arms from being removed from the tire;

and a lock for locking the clamping members in position when wrapped;

the lock comprising a plurality of holes in the first clamping member and at least one hole in the second clamping member, the lock holes in each clamping member being arranged in the base portion of the clamping member at a position closer to the outer edge than the pivot pin and the plurality of holes in the first clamping member being arranged in an arc around the pivot pin such that each in turn aligns with said at least one hole as the first clamping member is pivoted about the pivot pin and a locking pin engageable through the aligned holes of the clamping members.

* * * * *